(12) United States Patent
Planche

(10) Patent No.: US 6,386,806 B1
(45) Date of Patent: May 14, 2002

(54) MACHINING TOOL WITH DETACHABLE HEAD

(75) Inventor: Simon Planche, La Tour du Pin (FR)

(73) Assignee: Seco Tools, AB, Forsaljning (SE)

( * ) Notice: Subject to any disclaimer, the term of this patent is extended or adjusted under 35 U.S.C. 154(b) by 0 days.

(21) Appl. No.: 09/532,083

(22) Filed: Mar. 21, 2000

(30) Foreign Application Priority Data

Mar. 23, 1999 (FR) .............................. 99 03760

(51) Int. Cl.$^7$ ............................................ B23B 31/103
(52) U.S. Cl. ...................... 409/234; 279/77; 408/226; 408/239 R
(58) Field of Search .................. 409/231, 232, 409/234; 279/77, 90, 105, 145; 408/226, 239 R, 239 A, 240

(56) References Cited

U.S. PATENT DOCUMENTS

| | | | |
|---|---|---|---|
| 732,048 A | * 6/1903 | Coburn ................... | 408/239 A |
| 1,422,058 A | 7/1922 | Hovanec | |
| 1,783,541 A | * 12/1930 | Hogg et al. .................. | 279/77 |
| 2,734,413 A | * 2/1956 | Dunkelberger .............. | 279/77 |
| 3,600,999 A | * 8/1971 | Daniels ....................... | 279/90 |
| 4,906,147 A | * 3/1990 | Friesinger et al. .......... | 409/234 |
| 5,150,995 A | * 9/1992 | Reinauer .................... | 409/234 |
| 5,346,344 A | * 9/1994 | Kress et al. ................. | 409/234 |

FOREIGN PATENT DOCUMENTS

| | | | |
|---|---|---|---|
| CH | 86413 A | * 9/1920 | ................... 279/77 |
| DE | 2304249 A | * 10/1973 | .............. 408/239 R |
| EP | 0291477 | 11/1988 | |
| EP | 0486924 | 5/1992 | |

* cited by examiner

*Primary Examiner*—Daniel W. Howell
(74) *Attorney, Agent, or Firm*—Miles & Stockbridge P.C.; John C. Kerins

(57) ABSTRACT

The invention relates to a machining tool with a detachable head comprising:
- a head (2) carrying at least one cutting blade (3),
- a slender body (4) and
- means (5) for detachably fastening the head to the slender body.

Figure 1:
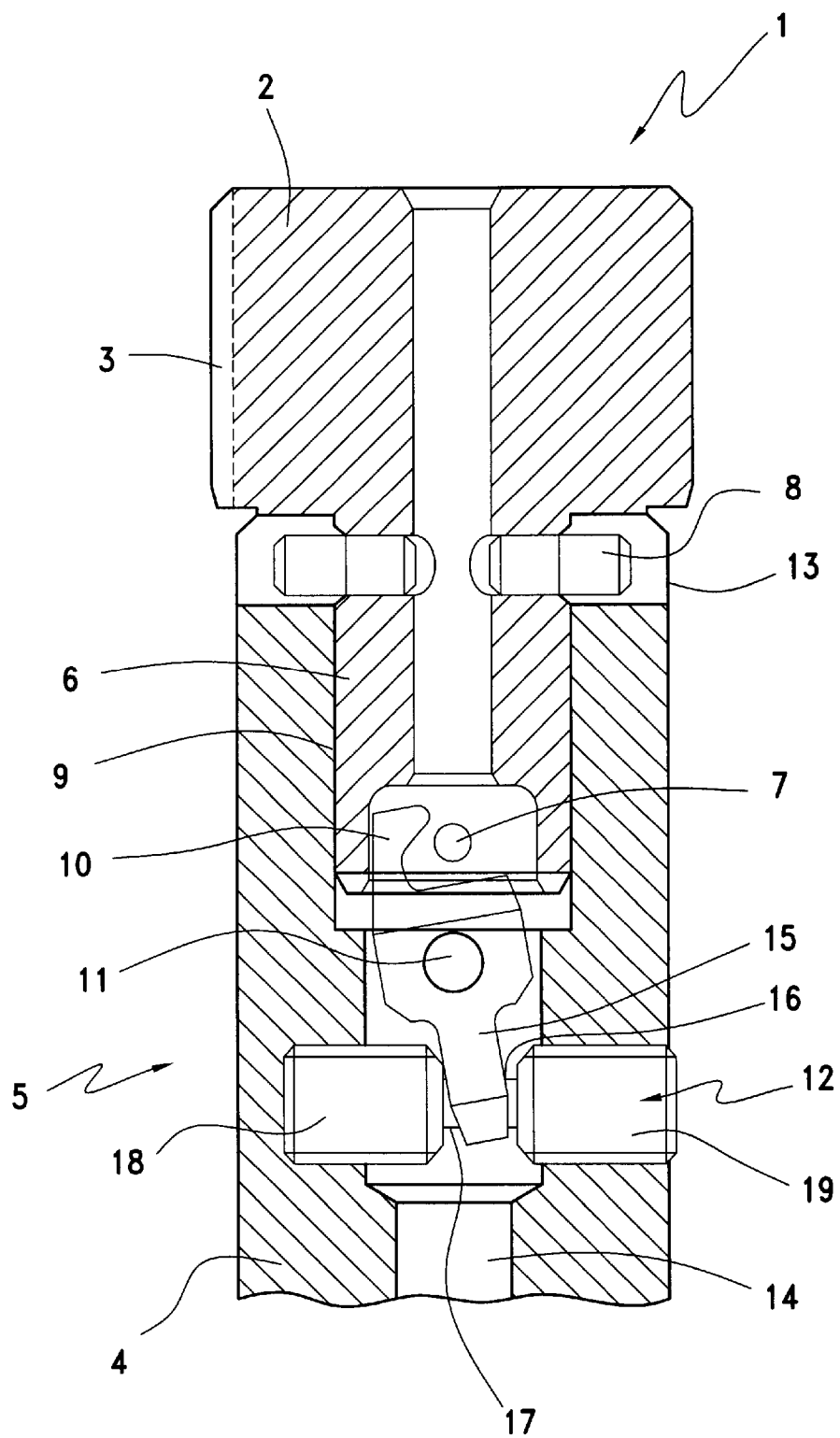

It is characterized in that:
- the head (2) comprises, in the rear part, a rotating cylinder (6) centered on the axis of rotation of the tool, and in its so-called front end, at least one lug (8) projecting from the cylindrical surface,
- the slender body (4) has, opening into its side facing the head, a boring (9) for housing the aforementioned rotating cylinder and a hook (10) mounted on a pivot pin (11), which hook is movable, by a control means (12), between a so-called locked position in which said hook is engaged with the so-called pivot pin of the head and a so-called released position that makes it possible to insert and remove the cylinder from the boring, and in the cylindrical wall delimiting the boring (9), at least one notch (13) for receiving the aforementioned lug (8).

5 Claims, 1 Drawing Sheet

MACHINING TOOL WITH DETACHABLE HEAD

The invention relates to a machining tool with a detachable head.

Machining tools are composed of a support that is slender overall wherein one of the two ends, called the active end, holds at least one cutting blade, and the other end, called the anchoring end, is adapted for being coupled with a tool holder such as a chuck of a machine tool.

Machining tool is understood to mean reamers that specifically make it possible to produce semi-finished surfaces, rather than boring tools or drills.

Drills are tools that form a roughly cylindrical cavity, while a reamer makes it possible to have a boring having the desired dimensions with substantial precision.

There are many existing coupling means for these reamers, and hence if one is using a set of machines from various sources, it is necessary to multiply the number of machining tools.

To obviate this problem, it is known to produce the machining tool in two parts comprising a head detachably mounted on a body having, in a rear part, means for coupling with a type of machine tool.

In order to ensure this detachability, means for fastening the head to the body are provided.

A screw system was initially used, and more precisely, one of the two pieces has a threaded hole into which a screw rod held by the other piece is inserted.

Angularly positioning the head relative to the axis of rotation of the body is nearly impossible because of the tolerances of the threads.

In place of this fastening system, is known to fasten the head by means of a screw passing axially through the rear part of the body of the tool and to mount the head so that it rotates around the axis of the rear part by means of two screws disposed radially in one of the two pieces, i.e., the rear part or the head, whose ends rest against two flat surfaces of the other piece.

A mounting of this type, as well as the preceding mounting, do not make it possible to convey a lubrication and/or cooling fluid through the tool.

In the boring field, there is a known fastening device (U.S. Pat. No. 1.422.058), which consists of forming on the back of a drill an annular groove into which a pivoting hook anchors laterally.

A sleeve covers the assembly locally so as to form a coupling.

A disposition of this type cannot be adapted to a reamer, wherein the rear part of the tool must have dimensions smaller than the diameter of the head.

The position of the anchoring of the hook also causes the tool to rock.

Moreover, it is impossible to direct a cooling fluid through the body of the tool.

The object of the invention is specifically to eliminate this drawback.

To this end, the subject of the invention is a machining tool comprising:
a head holding at least one cutting blade,
a slender body and
means for detachably fastening the head to the slender body,
this device being characterized in that:
the head comprises, in the rear part, a rotating cylinder centered on the axis of rotation of the tool, this rotating cylinder having, in its rear end, a clevis provided with a so-called catch pin and in its so-called front end, at least one lug projecting from the cylindrical surface,
the slender body has:
opening into its side facing the head, a boring for housing the aforementioned rotating cylinder and a hook mounted on a pivot pin, which hook is movable by a control means between a so-called locked position in which said hook is engaged with the so-called catch pin of the head and a so-called released position that makes it possible to insert and remove the cylinder from the boring.
in the cylindrical wall delimiting the boring, at least one notch for receiving the aforementioned lug.

The invention will be clearly understood with the help of the following description given as a non-limiting example, in reference to the attached drawing, which represents an axial section of the machining tool.

Referring to the drawing, we see a machining tool 1 comprising:
a head 2 holding at least one cutting blade 3,
a slender body 4, and
means 5 for detachably fastening the head to the slender body.

The tool is a reamer and it holds cutting blades which, unlike in a drill, are independent and are not helical in shape.

According to one characteristic of the invention:
the head 2 comprises, in the rear part, a rotating cylinder 6 centered on the axis of rotation of the tool, this rotating cylinder having, in its rear end, a clevis provided with a so-called catch pin 7, and in its so-called front end, at least one lug 8 projecting from the cylindrical surface,
the slender body 4 has:
opening into its side facing the head, a boring 9 for housing the aforementioned rotating cylinder and a hook (10) mounted on a pivot pin 11, which hook is movable by a control means 12 between a so-called locked position in which said hook is engaged with the so-called catch pin of the head and a so-called released position that makes it possible to insert and remove the cylinder from the boring, and
in the cylindrical wall delimiting the boring 9, at least one notch 13 for receiving the aforementioned lug 8.

Instead of a clevis, there can be a housing spanned by a pin.

The pin 7 is centered on the mid-plane so that the action of the hook occurs on the axis of the tool.

The same is true of the pivot pin of the hook.

A channel 14 centered on the axis of the tool runs through the slender body and the head of the tool.

The machining tolerances are defined so as to maintain the axial positioning of the head relative to the body.

The cross-sections of the aforementioned borings and housings are large enough to allow a fluid introduced at the rear end of the slender body into the aforementioned channel to be supplied to the machining head.

Preferably, the cylinder has at least two lugs 8, which are advantageously diametrically opposed, and hence the wall of the boring has two notches.

These lugs are, for example, constituted by the ends of a pin that passes through the cylinder completely or partially.

Since the rotational adjustment takes place close to the cutting blades, improved machining tolerances are obtained.

The control means 12 comprises, held by the hook, a so-called control plate 15 having an indentation 16, into which is inserted a so-called mid-section 17 of a bolt 18 which, at this location, has a section that is smaller than the two sections 19 located on either end.

The bolt 18 holds at one of the ends an indentation for its manipulation.

This results in a machining tool whose detachable fastening means guarantee a high degree of torque and a precise axial positioning obtained, in particular, through the use of a single radial chuck face.

The traction is exerted on the axis of the tool.

The tool is also simpler to produce since there are no conical surfaces as in the other devices, which are often necessary for the axial positioning of one part relative to another.

The blade-holding head is detachable without having to remove the end of the tool placed in the chuck.

The design of the means for fastening the head to the tool makes it possible to have a blade for frontal cutting in the front part of the head.

What is claimed is:

1. A machining tool with detachable head comprising:

a head (2) holding at least on e cutting blade (3), a slender body (4) and means (5) for detachably fastening the head to the slender body, characterized in that:

the head (2) comprises, a rotating cylinder (6) centered on an axis of rotation of the tool, said rotating cylinder having a front end and a rear end, a clevis provided with a catch pin (7) disposed in the rear end, and at least one lug (8) in the front end projecting out from the cylindrical surface, the slender body having, opening into a side facing the head, a boring (9) for housing the rotating cylinder and a hook (10) mounted on a pivot pin (11), said hook being movable by a control means (12) between a locked position in which said hook is engaged with the catch pin (7) of the head and a released position that makes it possible to insert and remove the cylinder from the boring (9), and at least one notch (13) in a cylindrical wall delimiting the boring (9) for receiving the lug (8).

2. A machining tool with detachable head according to claim 1, characterized in that the cylinder has at least two lugs (8), diametrically opposed and a lateral wall of the boring having two notches.

3. A machining tool with detachable head according to claim 1, characterized in that a channel (14) centered on the axis of the tool runs through the slender body (4) and the head (2) of the tool.

4. A machining tool with detachable head according to claim 2, characterized in that the lugs (8) are constituted by the ends of a pin passing through the cylinder.

5. A machining tool with detachable head according to claim 1, characterized in that the control means (12) comprises a control plate (15) held by the hook (10), and having an indentation (16) into which is inserted a mid-section (17) of a bolt (18) which, at this location, is smaller than two sections (19) of the bolt (18) located at either end.

* * * * *